United States Patent
Acampora

(10) Patent No.: US 6,751,455 B1
(45) Date of Patent: Jun. 15, 2004

(54) POWER- AND BANDWIDTH-ADAPTIVE IN-HOME WIRELESS COMMUNICATIONS SYSTEM WITH POWER-GRID-POWERED AGENTS AND BATTERY-POWERED CLIENTS

(75) Inventor: Anthony Acampora, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 510 days.

(21) Appl. No.: 09/663,068

(22) Filed: Sep. 15, 2000

Related U.S. Application Data

(60) Provisional application No. 60/154,615, filed on Sep. 17, 1997.

(51) Int. Cl.[7] .............................. H04Q 7/20; H04Q 7/24
(52) U.S. Cl. ................... 455/414.1; 455/41; 455/422.1; 455/448; 370/338
(58) Field of Search .................... 455/41, 343, 122, 455/126, 522, 421, 422, 414, 567, 402, 502, 11.1, 446, 556, 566, 53.1, 448; 370/349, 351, 352, 338, 408, 350; 709/248, 203; 340/825.31, 825.34; 379/56, 102, 96, 60, 59; 343/853, 824, 893, 751; 700/12, 20, 275

(56) References Cited

U.S. PATENT DOCUMENTS

| | | | | |
|---|---|---|---|---|
| 4,771,448 A | * | 9/1988 | Koohgoli et al. | 455/450 |
| 5,361,985 A | * | 11/1994 | Rein et al. | 236/49.3 |
| 5,564,070 A | * | 10/1996 | Want et al. | 455/507 |
| 5,802,467 A | * | 9/1998 | Salazar et al. | 455/420 |
| 5,999,094 A | * | 12/1999 | Nilssen | 340/507 |
| 6,304,556 B1 | * | 10/2001 | Haas | 370/254 |
| 6,396,457 B1 | * | 5/2002 | Gatherer et al. | 343/853 |
| 6,542,754 B1 | * | 4/2003 | Sayers et al. | 455/502 |
| 2002/0027894 A1 | * | 3/2002 | Arrakoski et al. | 370/338 |
| 2002/0047774 A1 | * | 4/2002 | Christensen et al. | 340/3.54 |

FOREIGN PATENT DOCUMENTS

WO        WO 99/17477        *  4/1999

OTHER PUBLICATIONS

HomeRF Specification HomeRF, Jul. 1, 2002, Revision 2.01.*

* cited by examiner

Primary Examiner—Dwayne Bost
Assistant Examiner—Kamran Afshar
(74) Attorney, Agent, or Firm—Fish & Richardson P.C.

(57) ABSTRACT

A radio link management system for a home or office substantially (i) an ad hoc network of agents wirelessly communicating among themselves, while (iii) clients wirelessly communicate with proximate agents. Control of the network may be centralized as network controller integrated with an agent, or may be distributed upon the network of agents. Some agent or agents, which may include an agent that is also the network controller, typically serves as a gateway device which connects to a worldwide communications network external to the home or office, normally by fiber or by wire.

Each agent is most commonly a small radio transceiver plus logic and power supply that mounts upon a wall and plugs directly into an AC power socket. Agents wirelessly communicate among themselves and with the controller—which may be centralized or distributed—in a bandwidth-efficient mode since prime power is not an issue. Each client, which is most commonly a battery-powered user device, wirelessly radio communicates with one or more proximately-located agents. Consistent with overall demand for the radio resource, parameters for radio communication are allocated ad hoc in a manner which is (a) client-dependent, and which (b) uses the least power from the battery-powered client. The agents establish an ad-hoc network among themselves, with routing among and between the agents being both multi-hop and "minimum hop" to conserve bandwidth. Accordingly both power and bandwidth are conserved, each as and where required and desired.

20 Claims, 1 Drawing Sheet

POWER- AND BANDWIDTH-ADAPTIVE IN-HOME WIRELESS COMMUNICATIONS SYSTEM WITH POWER-GRID-POWERED AGENTS AND BATTERY-POWERED CLIENTS

REFERENCE TO A RELATED PATENT APPLICATION

The present patent application is descended from, and claims benefit of priority of, U.S. Provisional Patent Application Serial No. 60/154,615 filed Sep. 17, 1999, for POWER AND BANDWIDTH ADAPTIVE IN-HOME WIRELESS COMMUNICATIONS SYSTEMS WITH POWER-GRID-POWERED AGENTS AND BATTERY-POWERED CLIENTS to the same inventor as the present application.

BACKGROUND OF THE INVENTION

1. Field of the Invention

The present invention generally concerns wireless communication, including in the home or office.

The present invention particularly concerns power, and bandwidth, management in and for wireless communications systems, most particularly as may be located in the home or office.

The present invention still more particularly concerns power and bandwidth management for wireless communications systems, especially as are used in the home of office, that is adaptive, and tailored to communications conditions.

2. Description of the Prior Art
2.1 Bluetooth and Home RF: Industry Efforts for Wireless Networking The present invention will be seen to concern power management in and for home and office wireless communications systems. Before specifically considering power management, it is useful to understand just what is the "state of the art" in home and office wireless communications, circa 1999. In this regard, Bluetooth and Home RF are the leading international efforts for wireless networking.

Bluetooth (www.bluetooth.com) is an effort by a consortium of companies to design a universal framework that offers a way to access information based on a diverse set of devices (e.g PDA, mobile PCs, phones, pagers) in a seamless, user-friendly and efficient manner. Bluetooth envisages a functional and connectivity model based on a combination of wireless access technologies—each matched to different device capabilities and requirements.

Another group of companies has formed the Home RF Working Group or Home RF (www.homerf.org), which has created the Shared Wireless Access Protocol (or SWAP).

The present invention will be seen to be a system and a method that can be implemented by use of the Bluetooth, or the HomeRF, standard and protocol, among other standards and protocols. Review of these wireless communications standards is useful primarily so as to show that the wireless communications links realized by the present invention are neither new nor exotic; circa 2000.

2.2 Bluetooth

"Bluetooth" is each of a consortium, a standard, and a (prospective) class of products. The present invention will be seen to be none of these: it is a system and a method that can be implemented by use of the Bluetooth standard and protocol, among other standards and protocols. Review of Bluetooth is useful primarily so as to show that the wireless communications links realized by the present invention are readily implemented, circa 2000.

A few years ago, the telecommunications and computing industries recognized that a truly low-cost, low-power radio based cable replacement, or wireless link, was feasible. Such a ubiquitous link would provide the basis for small portable devices to communicate together in an ad-hoc fashion. A study was performed, and a technology code named "Bluetooth" began to be defined. The goal was to provide effortless service for mobile and business users by means of a small, short range radio-based technology suitably integrated into production line models of a range of different devices.

Five companies—Ericsson, IBM, Intel, Nokia and Toshiba—teamed up in May, 1998, to address the rising tide of information currently received on mobile computers, cell phones and personal digital assistants. The result was the Bluetooth wireless communications initiative.

As of October, 1998, some 200 companies including 3Com, Compaq, Dell, Hewlett-Packard, Lucent, Motorola, NTT DoCoMo, Philips, Samsung, Siemens and Texas Instruments have joined the Bluetooth Special Interest Group (SIG).

Bluetooth technology is intended to enable users to connect their mobile computers, digital cellular phones, hand-held devices, network access points and other mobile devices via wireless short-range radio links unimpeded by line-of-sight restrictions.

Eliminating the need for proprietary cables to connect devices, Bluetooth technology will increase the ease and breadth of wireless connectivity. Users will be able to automatically receive e-mail on their notebook computers via the digital cellular phones in their pockets, or synchronize their primary PC with their hand-held computer without taking it out of their briefcase.

The overwhelming interest in Bluetooth technology from a wide range of industries demonstrates the growing importance of wireless communication, said Andrew M. Seybold, editor-in-chief, Andrew Seybolds Outlook and keynote speaker at the Bluetooth Developers Conference. Mr. Seybold found the Bluetooth SIG to include the right balance of industry leaders who can make the vision a reality.

The Bluetooth specification version 1.0 was publicly released on Jul. 26, 1999, and product announcements are imminent as of Fall, 1999. Early Bluetooth-enabled products are expected to include mobile computers, hand-held PCs, digital cellular phones and peripherals such as printers, projectors, PC Cards and hands-free head-sets. Network access points will also be available to facilitate access to LANs and WANs.

The core Bluetooth programmed wireless transmitter/receiver is expected to permit a free flow of data without bulky cables. The technology, which ultimately may cost as little as $5, is designed to work anywhere, even on airplanes.

Low power consumption—drawing only 0.3 mA in standby mode—enables maximum performance longevity for battery-powered devices. During data transfer the maximum current drain is 30 mA. However, during pauses, or at lower data rates, the drain will be lower.

2.3 The HomeRF Working Group

"HomeRF" is also each of a consortium, a standard, and a (prospective) class of products. As before, the present invention will be seen to be none of these, but only susceptible of implementation under the HomeRF standard. Review of HomeRF is useful primarily so as to again show, as with Bluetooth, that the wireless communications links realized by the present invention are readily implemented, circa 2000.

The HomeRF Working Group (HRFWG) was formed to provide the foundation for a broad range of inter-operable consumer devices by establishing an open industry specification for wireless digital communication. The specification is directed to wireless digital communication between PCs and consumer electronic devices anywhere in and around the home. The HRFWG, which includes the leading companies from the personal computer, consumer electronics, peripherals, communications, software, and semiconductor industries, has developed a specification for wireless communications in the home called the Shared Wireless Access Protocol (SWAP).

To date, the high cost and impracticality of adding new wires have inhibited the widespread adoption of home networking technologies. Wired technologies also do not permit users to roam about with portable devices. In addition, multiple, incompatible communication standards have previously limited acceptance of wireless networks in the home. The HRFWG believes that the open SWAP specification will break through these barriers by (1) enabling inter-operability between many different consumer electronic devices available from a large number of manufacturers, while (2) providing the flexibility and mobility of a wireless solution. This flexibility is important to the success of creating a compelling and complete home network solution.

Since the formation of the HEFWG was announced in March 1998, the total number of member companies has risen to more than 90, and continues to expand quickly. The inclusion of nearly all the leading consumer electronics companies in the working group ensures that consumers will benefit from a wide variety of innovative, inter-operable devices for use in and around the home.

2.3.1 Shared Wireless Access Protocol

The SWAP specification of the HomeRF Working Group (HRFWG) defines a new common interface that supports wireless voice and data networking in the home. Representation from the wide range of member companies, which span diverse industries, ensures that the final specification is complete and robust, and that devices envisioned as part of the home network are inter-operable. The SWAP specification is on target for release at the end of 1998.

Some examples of what users will be able to do with the availability of products that adhere to the SWAP specification include:

setting up a wireless home network to share voice and data between PC's, peripherals, PC-enhanced cordless phones, and new devices such as portable, remote display pads;

accessing the Internet from anywhere in and around the home from portable display devices;

sharing an ISP connection between PC's and other new devices;

sharing files/modems/printers in multi-PC homes;

intelligently forwarding incoming telephone calls to multiple cordless handsets, FAX machines and voice mailboxes.

reviewing incoming voice, FAX and e-mail messages from a small PC-enhanced cordless telephone handset;

activating other home electronic systems by simply speaking a command into a PC-enhanced cordless handset; and enabling multi-player games and/or toys based on PC or Internet resources.

2.4 Issues of Power, and Bandwidth, Utilization Optimization in the Home and Office Wireless Communications Environment The present invention deals with issues, and problems, regarding the utilization of both (i) power and (ii) bandwidth in the wireless communications environment, particularly in the home and/or office. These issues and problems are reasonably sophisticated, and sometimes subtle.

It is, of course, immediately obvious that wireless-communicating, normally radio-communicating, devices that are battery-powered should attempt to conserve power to (i) maximize the duration(s) of communication connectivity, and (ii) minimize the duration, frequency, inconvenience and expense of any necessary battery recharging and/or replacement. It is less obvious that there is a tradeoff between battery power and communications bandwidth. Less power may be used to realize a given signal-to-noise ratio if more radio communications bandwidth is used, and vice versa.

Each individual radio-communicating device may normally acceptably use relatively more radio bandwidth without unduly interfering with other devices—which may also desire large communications bandwidths—if the radius of communication is relatively shorter. But how can a short communication radius invariably be assured? And, if sufficient power is normally provided for only but a short communication distance, how can it be assured that enough power will be available should communications need to transpire over a longer distance? And how can it be assured that multiple broadband communicating devices will never be in conflict?

Worse, power and/or bandwidth communications allocations requirements may change (i) over time and (ii) with the location(s) of communicating devices. A intrinsically low-power device, or just a device running low on power, may simply refuse to communicate at a high data rate, or in a high-power channel communications code. Such a low-power device may need a lot of bandwidth to successfully communicate at all. A wireless communications system must accommodate the requirements of communicating both to, and from, such a low-power device.

However, at another time, and/or in another location, another device, or even the same device, may have abundant power, and may reasonably have a requirement to communicate at a high rate and/or in channel communications mode that is of high overall power and/or a narrow bandwidth (i.e., at a high power per unit bandwidth).

The present invention will be seen to (i) present a communications system framework that is intrinsically superior for the home and office wireless communications environment, and then, this framework being established, (ii) show how wireless communications may be dynamically adapted and optimized—both in power and bandwidth—to the exigencies of the moment, communicating optimally for conditions.

SUMMARY OF THE INVENTION

The present invention contemplates a new system organization, and method, for wirelessly communicating within the home or office, and certain new equipments needed to realize this new method.

Major problems associated with wireless at-home networks include (i) the wide variety of devices and applications which must be supported, (ii) cost, (iii) power constraints, and (iv) bandwidth constraints. The present invention deals with these problems in and by a dual strategy: (i) a superior home and office communications system "framework" is adopted, and then, this "framework" being set in place, (ii) wireless communications upon the "framework" is dynamically adapted and optimized in both power and bandwidth.

In the simplest possible terms, the wireless communication system of (i) superior design in accordance with the present invention is preferably (ii) operated adaptively, realizing superior wireless communication rates and reliability.

1. A Home and Office Wireless Communication System of New Design Uses "Agents"; The "Agents" Make the System Operate in Two Tiers, With Optimization of Communication The improvement accorded by the present invention to the existing "framework" of home and office wireless communication systems is this: the present invention adds "agents". In accordance with the present invention, much of the communications power requirement for local, home or office, wireless communication away from "clients" is moved from these "clients" onto a new class of radio-communicating networked devices which include intermediaries in the overall scheme of wireless communications and are referred herein as "agents." Examples for "clients" include, among others, functional devices such as telephones, computers, televisions, key pad controllers, burglar alarms, household appliances, and hybrids thereof. These abundant, low-cost, agents are essentially non-power-limited radio-frequency transceivers that plug inconspicuously into otherwise unused wall power outlets of the home or business. The agents may physically resemble surge protectors.

The agents are reasonably capable and "intelligent" to self-organize into communications networks, as will be discussed. They are typically more capable than are the system clients, which are relegated to wireless communicating only with agents along but a few wireless links.

Although some clients, notably including non-portable species of computers and larger televisions, heavy appliances, and burglar alarms, are permanently connected to the power grid, other battery-powered clients, notably including telephones, portable computers and portable radios and televisions, can immediately benefit from the present invention's re-partitionment of the "framework" of wireless communications. This is because the power requirements for these clients are sharply reduced: the clients need normally wirelessly communicate only to a very nearby agent a power-grid-powered wall-plugged radio frequency transceiver that is normally within the same room. Certainly, some clients that are permanently connected to the power grid may also be beneficially combined with agents.

Next, the same re-partitionment simultaneously beneficially conserves local radio frequency bandwidth. A client, especially a battery-powered mobile client, wirelessly communicates only with that agent to which it is electrophysically closest, normally over a distance of but a few meters. Very little radio frequency power need be used and, in accordance with the present invention, is used. The communications of other clients with other agents elsewhere in the same home or business is non-interfering (by action of agent-network-controlled agent-client communication, as will be explained).

The same re-partitionment also has a benevolent, or at worst a neutral, effect on issues of cost and diversity of devices supported. Basically, the abundantly-produced and liberally-sited ubiquitous wall-powered agents (i) eliminate, or at least mitigate, some of the requirements for (a) power, and/or for (b) sophistication in power management, in wirelessly-communicating home and/or office client devices. Meanwhile, the agents (ii) simultaneously lessen constraints, and/or any required sophistication, in the use of RF bandwidth by these client devices. Therefore, and although the agents—the wall-powered RF transceiver modules—are reasonably sophisticated (in accordance with existing communications protocols) in self-organizing into a wireless communications network, and are thus estimated to cost some few dollars each, the agents potentially (i) diminish demands on other home/office wireless communications system components, while (ii) adding great value to home/office wireless communications system performance.

The present invention is of good utility and effect just by addition of the agents, without more. However, once the agents are inserted into a home or office wireless communications system, the present invention contemplates still further improvements.

1.2 The Agents are Intelligent, Endowing the Wireless Communications Network Upon Which They are Distributed With "Adaptive Intelligence" as Permits Communication Optimization The agents are not merely radio repeaters. They also implement an expandable, open-ended, dynamic, distributed radio communications management system.

The collective agents—the distributed radio communications management system—a) registers clients (either at-home or visiting), b) authenticates visitors, c) maintains a link to external networks (e.g., to the PSTN, or the Internet), d) self-organizes a communications mesh e) implementing the MAC protocol, f) implements the LLC protocol, g) maintains link addresses for all clients and agents, and, most importantly, h) adapts the mesh, and the communications upon the mesh, to the numbers, powers and instantaneous communications requirements of the clients then connected on and by the communications mesh.

Little of this functionality is earthshaking, being that it has, by and large, recently come to exist in cellular and other mesh communications networks. In the past, however, the digital "intelligence" associated with communications system management has been reserved for physically large, geographically extensive, communications systems such as might typically serve a town or a city. The present invention has the "audacity" to bring the most powerful mesh communications methods—developed over decades at immense cost but as are now increasingly implemented in application specific integrated circuit chips—directly into the smallest environment: the home or office. Exactly because this environment is the "poorest" in every way—in power, in bandwidth, and in the confusingly high diversity of low sophistication communicating equipments—it is the very environment that can most benefit from the application of state-of-the-art sophisticated distributed communications control methodology. This is exactly the present invention teaches to do.

1.3 A Two-Tier Wireless Communications Network

The agents and clients of the present invention implement a "two-tier" wireless communications system. The invention may thus be thought of as a "two-tier" wireless communications system, and/or to be embodied in a "two-tier" wireless communications system. The "two tiers" are tiers of a communications hierarchy: in a first communications tier the agents communicate with other agents; in a second communications tier the local clients of each agent communicate with that agent.

Communications in each of the two tiers may be, and preferably is, separately conducted from communications in the other tier—but need not be so separated and divided. For example, in one embodiment of the "two-tier" wireless communications system of the present invention communications between agents in one tier is at a different radio frequency than communication between an agent and its associated clients otherwise transpiring in the other tier. In another embodiment of the "two-tier" wireless communications system of the present invention communications between agents in one tier transpires during a different time slice than does communication between an agent and its associated clients otherwise transpiring in the other tier. In still yet another embodiment of the "two-tier" wireless communications system of the present invention communications between agents in one tier transpires with and at different code divisions than does communication between an agent and its associated clients in the other tier.

Although the communication in tiers is preferably so separated and divided in any of frequency, time division or code division, the communication need not invariably be so divided. Instead, the unique address of each agent and client can be relied upon.

Consider first the agents. When a group of agents is initially powered on, or a new agent is introduced to an existing group, all the agents will attempt to, and will—in a manner and procedure quite normal for wireless communications—form an ad hoc (wireless) communications network. Each agent attempts to communicate with every other. Some communications links are enabled; others fail. The agents serve to create ad hoc what can ultimately be expressed in a conventional connectivity diagram where, by convention, a line is drawn an the diagram between two devices that are (radio) communicating. Where no communication is present, no line is drawn.

The agents thus form of themselves, and without outside intervention or control, a (radio) communications mesh. This mesh, this ad hoc communications network, is the "backbone" of the two-tier wireless (radio) communications network of the present invention. Communication between agents may transpire under the IEEE 802.11 standard, or the Bluetooth standard, or any suitable network radio communications standard.

Consider now the clients. The numerous clients are desirably simpler, and less expensive, than are the agents. The clients use less power than do the agents. Attendant upon a lack of both (i) sophistication, and (ii) power, the preferred clients are typically not capable, as are the agents, of self-organizing into a communications network. Instead, the clients may be and preferably are, by way of example, impressed with a series of fixed addresses at the times when they, are built. Upon being powered on, the client will look to communicate with each of these fixed addresses in turn, and will ultimately end up addressing a local agent. From this point forward the client will communicate only with its associated agent. This communication also may transpire under the IEEE 802.11 standard, or the Bluetooth standard, or any suitable network radio communications standard.

2. Embodiments of the Present Invention

Accordingly, the present invention may be considered to be embodied in each of (i) a local wireless communications system, (ii) a wireless communications system where power and/or bandwidth is allocated efficiently, (iii) a wireless communications system distributed among and between power-grid-powered intelligent "agents" communicatively servicing battery-powered dumb clients, and (iv) a two-tier wireless communications system.

2.1 A Local Wireless Communications System

Therefore, in one of its aspects the present invention may be considered to be embodied in a local wireless communications system. A "local" wireless communications system means a system for, most commonly, a home or a business, or even a farm or a mall or a school or a business park. However, a "local" wireless communications system is not a system for a neighborhood, nor for a community, nor for a city, nor for other, still larger, areas.

The system has number of clients, at least one of which is powered from a portable power source. Each client locally wirelessly communicates by radio. Each client performs an additional function with, and for, a human user other than just radio communication. Indeed, this is the meaning of a "client", which is something that performs a function beyond just radio communication. Examples of "clients" are radio-communicating telephones, televisions, computers, keypad controllers, burglar alarms, and appliances.

The system further includes a number of communication agents. Each agent is powered from a power grid. The agents first locally wirelessly radio-communicate between themselves in a local wireless radio communications network. The agents second locally wirelessly radio-communicating with the plurality of clients.

An optional communications gateway device, also powered from the power grid, controls local wireless radio communication (i) between the agents upon the network and (ii) an external worldwide communications network (e.g., the Internet).

By this organization the agents are each powered from the power grid while at least one of the clients—and normally many, most or even all clients—is powered from a portable power source. Nonetheless that an individual client may be powered by battery power source, it can radio-communicate to at least dome agent. Meanwhile, the several power-grid-powered agents communicate via radio links among themselves in a communications mesh network. Therefore, at the very onset, the system of the present invention suffices to extend battery-powered radio-communication from a battery-powered radio-communicating agent to at least some number of power-grid-powered communication agents.

If the communications system includes the optional communications gateway device, also powered from the power grid, that globally communicates to a worldwide communications network external to the local area of radio communication, then this gateway device may be functionally separate from all the plurality of communications agents, in which case it locally wirelessly radio-communicates with at least one agent. Alternatively, this communications device may be integrated with a communications agent, in which case it is powered from the power grid identically as is the communications agent.

The gateway communications device may be of the order of a modem, globally communicating via a physical communication channel of a wire or a fiber type. The communications device may be of the order of a long range radio or optical transceiver, globally communicating via an atmospheric communication channel of the radio of free-space optical types.

In either case, it is clear that a communications path is extended all the way from the at least one client that may be, and most often is, battery-powered via one or more agents, and via the communications gateway device—all of which are power-grid-powered—all the way to a global communications network.

Since only at least one client needs to be powered from a battery power source, not all clients have to be so battery-powered and, indeed, some of the clients may be powered from the power grid. In this case—where at least some clients are powered from the power grid—then at least some of these power-grid-powered clients are physically housed with some ones of the agents. The agents are, of course, all and always powered from the power grid. This is to say no more than that clients and agents may be combined, with some network-radio-communicating power-grid-powered devices being both (i) clients and (ii) agents without in any way diminishing, let alone destroying, the integrity of the present invention. For example, that a power-grid-powered computer work station should be network-radio-communicating (or vice versa that a network-radio-communicating computer work station should be power-grid-powered), in no way detracts from the application, and benefit, of the present invention that, to continue the example, a battery powered telephone should be radio-communicating to, and through, a power-grid-powered network-radio-communicating agent.

In certain, preferred, embodiments of the system the radio-communicating between clients upon the network is multi-hop. This multi-hop radio-communicating between clients upon the network is preferably may be in accordance with any of several wireless communications protocols.

To again emphasize the utility, and the trade-offs, in such a communications system, consider that the radio-communicating between clients upon the network preferably transpires in a communications protocol that consumes a relatively higher power while radio-communicating between the clients and the agents transpires in a communications protocol that consumes a relatively less power. Clearly the power consumed radio-communicating between at least that client which is powered from a portable power source, and an agent, which is invariably powered from a power grid, is less than power consumed radio-communicating between the of agents. Clearly power is conserved to the client, which is beneficial if the client is battery-powered.

Meanwhile, consider that the radio-communicating between the clients upon the network preferably transpires in a communications protocol that consumes a relatively more bandwidth (and relatively less time) while radio-communicating between the plurality of clients and the plurality of agents transpires in a communications protocol that consumes relatively less bandwidth (and relatively more time). Clearly the spectrum (and the time) of radio communication is partitioned. This is desirable when, as is the case with the present invention, available spectrum is made available to those devices with the power to use it (i.e., power grid power), and withheld from those devices without sufficient power (i.e., with only battery power) to fully avail themselves of it.

2.2 A Wireless Communications System Allocating Large Bandwidth Where There is Power to Use Bandwidth (Equivalently, Conserving Bandwidth Where There is Insufficient Power for Its Effective Use), or, Alternatively, Organized for Providing Power Where Large Bandwidth May Effectively Be Used (Equivalently, Accommodating Lower Power Where Bandwidth May Not Efficiently be Used)

By this point in this specification it should be beginning to be understood that the present invention is not merely yet another assemblage of parts, and yet another partitionment of a radio system, for moving a message by message by radio from point "A" to point "B", but is instead concerned with optimally so doing. Optimization in accordance with the present invention is in consideration of each of (1) power constraints, (2) bandwidth constraints, (3) the wide variety of radio-communicating devices and applications which must be supported, and (4) cost.

In another of its aspects the present invention may be considered to be embodied in a radio link management system for a home or office. The system has (i) a network of agents wirelessly communicating among themselves, and (ii) clients wirelessly communicating with proximate agents. An (i) agent may also be a (ii) client, and vice versa—although agents and clients are mostly separate. Control of the network may be (i) centralized, as on a network controller that is integrated with an agent, or may be (ii) distributed upon the network of agents. Some agent or agents, which may include an agent that is integrated with a network controller, typically connects to one or more communications servers external to the home or office, normally by fiber or by wire. This connection is most commonly to a worldwide digital communications network, also known as the Internet.

Each agent is most commonly a small radio transceiver plus logic and power supply that mounts on a wall and plugs directly into an AC power socket. Agents wirelessly communicate among themselves and with any agent that integrates a controller (if network control is centralized, which it most commonly is not) in a bandwidth-efficient mode since prime power is not an issue. Each client—which is most commonly a battery-powered user device—wirelessly communicates, normally by radio, with one or more agents, and normally with but one agent at one time.

Consistent with overall demand for the radio resource, the radio management system chooses the parameters for this communication in a manner which is (a) client-dependent, and which (b) uses the least power from the battery-powered clients. The agents establish an ad-hoc network among themselves, with routing among and between the agents being "minimum hop" to conserve bandwidth. Accordingly both power and bandwidth are conserved, each as and where required and desired.

The present invention addresses these issues of allocation, and optimizes radio communication, by creating the aforesaid radio link management system consisting of (i) agents plus (ii) clients. In this radio link management system (ii) clients wirelessly communicate through, and only through, the (i) agents. There is no client-to-client communication.

Each (ii) agent is a non-power-limited radio transceiver which attaches to power other than a battery. Most often an agent consists of a small radio transceiver plus logic and power supply that mounts on a wall and plugs directly into an AC power socket. Agents wirelessly communicate among themselves and with any controller (which may be centralized or distributed) always in a bandwidth-efficient mode (since power is not an issue).

The (ii) clients are radio-communicating devices that are power limited, and that are most commonly powered by batteries. Each (ii) client wirelessly communicates with an (i) agent.

Consistent with overall demand for the radio resource, the radio management system chooses the parameters for this communication in a manner which is (a) client-dependent, (b) using the least power from the client (which typically operates from a battery). For example, if radio communication demand is light, then a very powerful channel code might be used when the client transmits. Also, the information and channel rates may be different for different clients. When sending to a particular client, the radio management system uses a format which is compatible with the capabilities of that client.

When the agents establish an ad-hoc network among themselves, in which network communications paths may be, and most often are, multi-hop, then communication paths are "minimum hop" to conserve bandwidth. A client may send to an agent different than the one from which it receives: a client sends to the "lowest power required" agent while it listens to the "lowest bandwidth consumed" agent.

Accordingly, the radio spectrum resource may be viewed as being time-shared among agents and clients, although, in general, the radio resource manager/controller is free to partition time and spectrum in any way consistent with the capabilities of the devices, the demand, and the desire to variously conserve both battery power and radio bandwidth.

This is an important concept: because the network is "ad hoc"; it configures in a manner best calculated to conserve bandwidth where, by operation of the present invention, power is innately conserved. If new clients and/or agents are added, the network will automatically re-configure. The network ends up being dynamic, and adaptive, to conserve both battery power and radio bandwidth. For example, suppose some battery-powered client constantly early discharges its batteries in a manner disadvantageous to its desired use. Under this condition, adding an agent plugged to a wall plug in close proximity to the client may serve to significantly help the client's energy budget, and to usefully prolong the duration of the client's operation before battery discharge occurs.

2.3 An Adaptive Distributed Wireless Communications System Based on Power-Grid-Powered Intelligent "Agents" Communicatively Servicing Battery-Powered Dumb Clients In yet another of its aspects the present invention may be considered to be embodied in a distributed radio link, or radio communications, management system.

Such a wireless communications management system serves to communicatively interconnect a plurality of clients—at least one of which is powered from a portable power source and at least one of which both locally wirelessly communicates by radio and performs some additional function with and for a human user other than just radio communication. The wireless communications management system is implemented as a number of communication agents, each powered from a power grid within a home or business, that collectively form a communications mesh.

Each agent first locally wirelessly radio-communicates with other agents in a local wireless radio communications network, second locally wirelessly radio-communicating with local clients.

The agents collectively (1) register clients to the communications mesh, (2) maintain a link to external networks, and (3) self-organizing the communications mesh.

The collective agents preferably further (4) adapt wireless communications upon the mesh to any of the numbers, powers and instantaneous communications requirements of the clients then connected on and by the communications mesh.

Still further, the collective agents (5) authenticate visiting clients to the communications mesh. When the collective agents (2) maintain the link to the external networks, the preferably so maintain the link to a worldwide communications network, namely, the Internet.

Still further, the collective agents (3) self-organize the communications mesh, they implement the MAC protocol, and also the LLC protocol.

The collective agents preferably further (6) maintain link addresses for all clients and agents.

2.4 A Two-Tier Wireless Communications System

In still yet another of its aspects the present invention may be considered to be embodied in a two-tier wireless communications system.

The system has a number of communication agents that first locally wirelessly radio-communicating between themselves (to such extent as wireless connectivity in a local wireless radio communications network permits). This first locally wirelessly radio-communicating is in a first communications tier separate from any other communications tier. Each agent further second wirelessly radio-communicates with one or more uniquely associated clients (again to such extent as wireless connectivity in a local wireless radio communications network permits). This second wirelessly radio-communicating is in a second communications tier separate from the first and from any other communications tier.

Meanwhile, a number of clients each locally wirelessly radio-communicate to one or more associated agents, only; no communication transpiring to any un-associated ones of the plurality of agents. This local wirelessly radio-communicating is in the second communications tier.

By this partitionment the communication agents are self-organizing to produce a communications mesh while each of the plurality of clients is capable only of identifying, and communicating to, one or more agents. The clients become communicative from one to another only by communication links proceeding through one or more of the plurality of agents.

The first locally wirelessly radio-communicating between plurality of agents at the first communications tier may transpire, for example, at a first radio frequency while the second locally wirelessly radio-communicating between plurality of agents and associated ones of the plurality of clients at the second communications tier transpires at a second radio frequency.

The first locally wirelessly radio-communicating between plurality of agents at the first communications tier may instead transpire at a first time interval, while the second locally wirelessly radio-communicating between plurality of agents and associated ones of the plurality of clients at the second communications tier transpires at a second time interval.

The first locally wirelessly radio-communicating between plurality of agents at the first communications tier may even transpire at a first code division while the second locally wirelessly radio-communicating between plurality of agents and associated ones of the plurality of clients at the second communications tier transpires at a second code division.

These and other aspects and attributes of the present invention will become increasingly clear upon reference to the following drawings and accompanying specification.

DESCRIPTION OF THE PREFERRED EMBODIMENT

1. The System of the Present Invention

Figure 1:
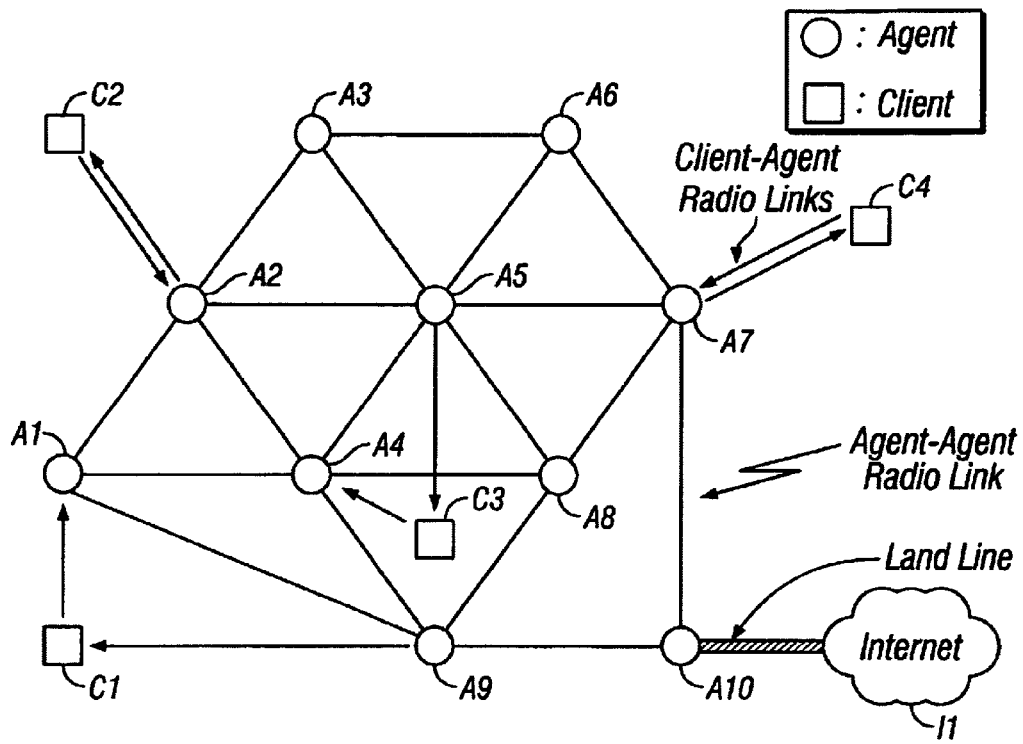
FIG. 1 is a block diagram of a system in accordance with the present invention including agents and clients all connected by radio links.

A simple block diagram of the system of an exemplary preferred system in accordance with the present invention is shown in FIG. 1. Shown in this diagram are (i) agents A1–A10 (which are geographically distributed throughout the home or office), (ii) clients C1–C4, and (iii) the radio links between the agents, and between the clients and the agents. Links are drawn to show the typical permissible connections among and between (i) the agents A1–A10, and (ii) the system-mandated connections between agent or agent pairs and clients. The connections (ii) are exemplified by the connections between (i) the agents or agent pairs A1, A9; A2; A4, A5; and A7, and (ii) the clients C1; C2; C3; and C4 respectively associated with these agent(s).

For example, whenever agent A3 sends, agents A2, A5 and A6 are capable of receiving that signal. There is no client—or at least no remote radio-communicating client, being that a client may be integrated with and agent—associated with agent A3. An agent communicating with a client is, for example, agent A2 that is associated with, and that communicates with, client C2. A pair of agents associated with, and communicating with, a single client are agents A5 and A4 that communicate with client C3: agent A5 sending communications to the client C3 while agent A4 accepts communications from the client C3.

For agent-to-agent transmission, control of the system (which may be (i) distributed, or (ii) centralized in a system controller) in general chooses a route which serves to minimize the number of hops, since this also serves to minimize the bandwidth consumed. Consider, for example, that a 2-hop path implies that a message was sent twice, thereby doubling the consumed radio-capacity.

Note that any client which has access to AC power (no battery constraint) can also serve as an agent, if it has the appropriate equipment to do so. The radio management system is responsible for: a) registering clients (either at-home or visiting), b) authenticating visitors, c) maintaining a link to external networks (e.g., PSTN, Internet), d) self-organizing the mesh, e) maintaining link addresses for all clients and agents, while h) adapting the mesh.

Any centralized, or distributed, radio management devices may, or may not, enjoy battery backup. Actual communications among clients C1–C4 may use VCs since routing tables can then be rewritten connection-by-connection.

Accordingly, an in-home or in-office radio communication system in accordance with the present invention advantageously exploits that which is abundant: AC power outlets. By attaching agents with their radios to many of these outlets, a situation is created whereby each battery-operated device is required to communicate only with a nearby agent, which may be only several feet away, over a path which is typically line-of-sight. Each agent, which is not constrained in power, can then provide services to its associated client or clients which (i) minimizes the client's battery drain, (ii) maximizes the quality of the radio link, and (iii) supports overlay applications. The agent can reduce—perhaps dramatically—the required client functionality by performing communications management functions on the client's behalf. This is useful because agents may be, and often are, more abundant than are clients, as is perhaps better illustrated in FIG. 2 next discussed than in FIG. 1.

2. Use of the System in a Wireless Home of Office

Keys to a wireless home communications system are: a) low cost; b) low power, battery-only, devices; c) interference abatement; d) compatible service to grossly dissimilar devices; and e) portability within the home, and within a "foreign home", environments especially as accommodates second and third generation plug cellular personal communication systems (PCS).

Within the home, prime power from a power grid is available, optionally with battery backup.

In one embodiment of the present invention, the radio links are managed by a controller that may be either (i) centralized or (ii) distributed on a number of radio-communicating agents. The radio controller, including when implemented as a number of distributed agents, always receives prime power via wall electrical outlets. Distributed agents are small and inconspicuous, and directly plug into wall sockets in the same room in which clients are located. The agents are normally designed to manage only the radio links of the closest clients presenting the strongest radio signals, which normally means clients in the same room.

Some of the radio resource is consumed by distributed radio controller/agent communication. The radio network controller (whether centralized or distributed) and the agents comprise a fully-powered, ad-hoc network. See an exemplary network in FIG. 2 where three agents A11–A13 communicate by radio. Each of agents A11 and A13 is associated with, and communicates with, a number of clients. Agent A12 has a connection to Internet I1.

Figure 2:
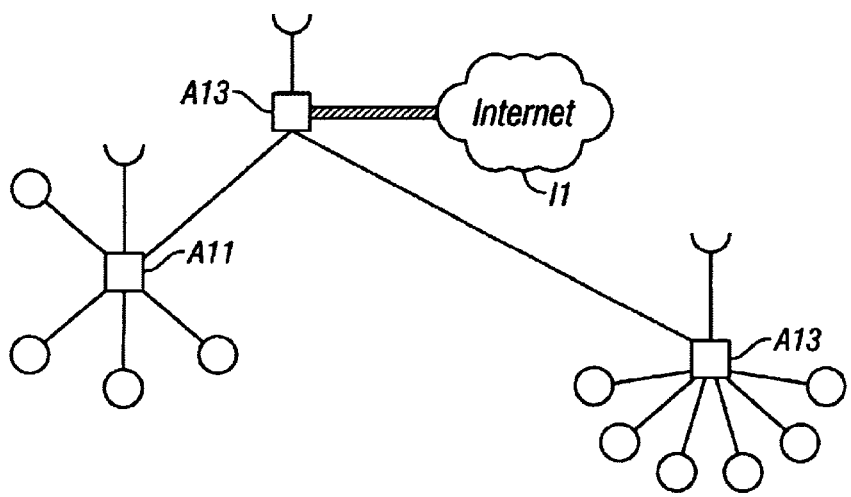
FIG. 2 is a diagrammatic representation of the radio links between an agent integrated with a portal device, two other agents and the clients to the two agents.

The radio network controller of FIG. 2 might be integrated within any of the agents A11–A13, or might be distributed among them. The agents A11–A13 are all powered from a power grid; all establish the mesh connectivity using enough power to maintain all necessary links. An occasional air, or radio, interface may be selectively replaced by a land line, normally a cable or optic fiber, without destroying the essential integrity, and effectiveness, of the present invention. Such a substitution is normally done for radio-link-controller/agent-to-agent convenience. For example, if expansion of a local network is causing radio communication to become overcrowded, it is a simple matter to replace a excessively busy link with a land line, thereby freeing up radio spectrum. Note that for the purposes of self organization, the system may still regard this substituted link as a radio link—it is simply that the traffic thereon has precipitously fallen to zero.

Although the agents are fully powered to forge such radio links as are necessary, clients are served by best available radio link to an agent, or to two agents (with one agent for incoming, and the other for outgoing, communications). In this case "best means" "lowest power."

All client peer-to-peer communications necessarily involve at least one agent, and normally involve relays among and between agents. There is no client-to-client communication. (Indeed, this distinction is one of the defining differences between clients and agents.) Each client connects to one or to two agents in the most bandwidth efficient paths are used, given that neither the individual agents, nor the agents collectively, are not power limited. In other words, a client is "selfish", and uses the path best calculated to save itself energy, even if this ultimately causes the agents to use more power since this power comes from the utility grid.

Some clients can also be integrated with agents. Namely, those clients having prime power can also be agents.

3. Communication Within the System is in Tiers

Communication between, on the one hand, (i) agents, and, on the other hand, (ii) between agents and their associated client (s) is in two non-overlapping tiers. The two tiers may be separated in any of radio frequency, or time interval, or code interval.

Figure 3:
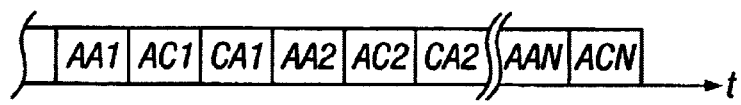
FIG. 3 is a time line showing an exemplary distribution in the time domain of radio communications upon the system of the present invention.

Different client sets may further have different air interfaces. For example, agent-to-agent communications that are divided in time interval, or time-division, are illustrated in FIG. 3.

Communication between agents and agents transpires in time intervals AA1, AA2 . . . AAN. Communication from agents to clients transpires in time intervals AC1, AC2, . . . ACN. Communication from clients to agents transpires in time intervals CA1, CA2, . . . CAN. The time intervals need not be equal.

The radio link controller (whether centralized or decentralized) manages the time allocation in response to demand, need for diagnostic routines, etc.

Multiple independent applications can be supported. Application needs are sent to the radio link controller (whether centralized or distributed).

In accordance with the preceding explanation, variations and adaptations of the communications system in accordance with the present invention will suggest themselves to a practitioner of the communications system arts. For example, having more than one agent that interfaces to an external communication network does not negate the effectiveness of the system. The existence of clients that are power-use-insensitive, such as by being powered from the power grid, does not affect the benefit of the present system for clients that are not power-use-insensitive.

In accordance with these and other possible variations and adaptations of the present invention, the scope of the invention should be determined in accordance with the following claims, only, and not solely in accordance with that embodiment within which the invention has been taught.

What is claimed is:

1. A wireless communications system comprising:
   a plurality of communication agents forming a communications mesh to first locally wirelessly radio-communicating between themselves in a local wireless radio communications network, with each communications agent second locally wirelessly radio-communicating with associated ones of plurality of clients; and
   a plurality of clients, each performing an additional function other than just radio communication, each client locally wirelessly communicating by radio with at least one associated communications agent, and with no other clients nor any unassociated agents;
   wherein each of the plurality of communication agents is powered from a power grid while at least one of the plurality of clients is powered from a portable power source.

2. The communications system according to claim 1 wherein one of the agents that is locally wirelessly radio-communicating with at least one client is also wirelessly radio-communicating to a gateway device communicating upon an external-communications network;
   wherein wireless radio communication between the agents is further globally communicated by the gateway device to the external communications network.

3. The communications system according to claim 2 wherein the gateway device globally communicates via a physical communication channel selected from the group consisting of wire and fiber.

4. The communications system according to claim 2 wherein the gateway device globally communicates via an free-space communication channel selected from the group consisting of radio and free-space optical.

5. The communications system according to claim 1 wherein at least one of the clients is drawn from a group consisting of:
   telephones;
   televisions;
   computers;
   keypad controllers;
   burglar alarms; and
   appliances.

6. The communications system according to claim 1 wherein at least some of the clients are not powered from a portable power source and are instead powered from the power grid; and
   where at least some of these at least some clients powered from the power grid are physically housed with some ones of the agents which agents are all, and always, powered from the power grid.

7. The communications system according to claim 1 wherein the radio-communicating between agents upon the network is multi-hop.

8. The communications system according to claim 1 wherein the radio-communicating between the plurality of agents upon the network transpires in a communications protocol that consumes a relatively higher power; and
   wherein the radio-communicating between the plurality of clients and associated ones of the plurality of agents transpires in a communications protocol that consumes a relatively lesser power;
   wherein the power consumed by a client, at least one of which is powered from a portable power source, radio communicating with an associated agent, which agent is invariably powered from a power grid, is less than the power, consumed radio-communicating between any two of the plurality of agents.

9. The communications system according to claim 1 wherein the radio-communicating between the plurality of agents upon the network transpires in a communications protocol that consumes a relatively more bandwidth and relatively less time; and
   wherein the radio-communicating between the plurality of clients and the plurality of agents transpires in a communications protocol that consumes relatively less bandwidth and relatively more time;
   wherein time and spectrum of radio communication are partitioned.

10. A wireless communications management system wirelessly communicatively interconnecting a plurality of clients, at least one of which is powered from a portable power source and at, least one of which both locally wirelessly communicates by radio and performs some additional function with and for a human user other than just radio communication, the system comprising:
    a plurality of communication agents, each powered from a power grid within a home or business, collectively forming a communications mesh, each agent
    first locally wirelessly radio-communicating with other agents in a local wireless radio communications network, and
    second locally wirelessly radio-communicating with local ones of the plurality of clients, and
    the collective agents
    registering clients to the communications mesh
    maintaining a link to external networks, and
    self-organizing the communications mesh.

11. The wireless communications management system according to claim 10 wherein the collective agents are further adapting wireless communications upon the mesh, to any of the numbers, powers and instantaneous communications requirements of the clients then connected on and by the communications mesh.

12. The wireless communications management system according to claim 10 wherein the collective agents are further authenticating visiting clients to the communications mesh.

13. The wireless communications management system according to claim 10 wherein the collective agents maintaining the link to an external networks are maintaining a link to a worldwide communications network.

14. The wireless communications management system according to claim 10 wherein the collective agents self-organizing the communications mesh are implementing the MAC protocol.

15. The wireless communications management system according to claim 10 wherein the collective agents self-organizing the communications mesh are implementing the LLC protocol.

16. The wireless communications management system according to claim 10 wherein the collective agents are further maintaining link addresses for all clients and agents.

17. A two-tier wireless communications system comprising:
- a plurality of communication agents
- first locally wirelessly radio-communicating between themselves to such extent as wireless connectivity in a local wireless radio communications network permits, the first locally wirelessly radio-communicating transpiring in a first communications tier separate from any other communications tier, with each agent
- second wirelessly radio-communicating with one or more uniquely associated clients to such extent as wireless connectivity in a local wireless radio communications network permits, the second wirelessly radio-communicating transpiring in a second communications tier separate from the first and from any other communications tier; and
- a plurality of clients each locally wirelessly radio-communicating in a local wireless radio communications network to one or more associated agents, only, with no communication transpiring to any un-associated ones of the plurality of agents, this locally wirelessly radio-communicating transpiring in the second communications tier;
- wherein the plurality of communication agents are self-organizing to produce a communications mesh while each of the plurality of clients is capable only of identifying, and communicating to, one or more agents;
- wherein the plurality of clients become communicative from one to another only by communication links proceeding through one or more of the plurality of agents.

18. The two-tier wireless communications system according to claim 17 wherein the first locally wirelessly radio-communicating between plurality of agents at the first communications tier is at a first radio frequency; and
- wherein the second locally wirelessly radio-communicating between plurality of agents and associated ones of the plurality of clients at the second communications tier is at a second radio frequency.

19. The two-tier wireless communications system according to claim 17 wherein the first locally wirelessly radio-communicating between plurality of agents at the first communications tier is at a first time interval; and
- wherein the second locally wirelessly radio-communicating between plurality of agents and associated ones of the plurality of clients at the second communications tier is at a second time interval.

20. The two-tier wireless communications system according to claim 17 wherein the first locally-wirelessly radio-communicating between plurality of agents at the first communications tier is at a first code division; and
- wherein the second locally wirelessly radio-communicating between plurality of agents and associated ones of the plurality of clients at the second communications tier is at a second code division.

* * * * *

UNITED STATES PATENT AND TRADEMARK OFFICE
CERTIFICATE OF CORRECTION

PATENT NO. : 6,751,455 B1  
DATED : June 15, 2004  
INVENTOR(S) : Anthony Acampora It is certified that error appears in the above-identified patent and that said Letters Patent is hereby corrected as shown below:

Title page,
Item [60], Related U.S. Application Data, correct to read as follows:
-- (60) Provisional application No. 60/154,615, filed on Sep. 17, 1999. --

Signed and Sealed this

Seventh Day of September, 2004

JON W. DUDAS
*Director of the United States Patent and Trademark Office*